United States Patent
Moore et al.

(10) Patent No.: US 7,424,451 B1
(45) Date of Patent: Sep. 9, 2008

(54) SYSTEM AND METHOD OF SOLVING OPTIMIZATION PROBLEMS USING PRESTORED ADVANCED BASES

(75) Inventors: Bruce Wayne Moore, Coppell, TX (US); James Richard Kraemer, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 09/685,838

(22) Filed: Oct. 10, 2000

(51) Int. Cl.
*G06Q 40/00* (2006.01)

(52) U.S. Cl. .............................. 705/37; 705/38; 705/36; 705/35; 705/5

(58) Field of Classification Search ................... 705/36, 705/7, 37, 35, 38; 703/6; 706/13; 707/2, 707/4; 395/674
See application file for complete search history.

(56) References Cited

U.S. PATENT DOCUMENTS

| | | | | |
|---|---|---|---|---|
| 5,045,794 A | 9/1991 | Dorri et al. | | 324/320 |
| 5,615,121 A | 3/1997 | Babayev et al. | | 395/209 |
| 5,764,241 A | 6/1998 | Elliot et al. | | 345/473 |
| 5,822,747 A * | 10/1998 | Graefe et al. | | 707/2 |
| 5,905,666 A | 5/1999 | Hoffman et al. | | 364/754.02 |
| 6,003,018 A | 12/1999 | Michaud et al. | | 705/36 |
| 6,012,044 A | 1/2000 | Maggioncalda et al. | | 705/36 |
| 6,012,098 A | 1/2000 | Bayeh et al. | | 709/246 |
| 6,021,402 A | 2/2000 | Takriti | | 705/412 |
| 6,031,984 A | 2/2000 | Walser | | 395/500.23 |
| 6,086,619 A * | 7/2000 | Hausman et al. | | 703/6 |
| 6,128,607 A * | 10/2000 | Nordin et al. | | 706/13 |
| 6,400,773 B1 * | 6/2002 | Krongold et al. | | 375/260 |
| 6,546,375 B1 * | 4/2003 | Pang et al. | | 705/37 |

OTHER PUBLICATIONS

Hedging the exchange rate risk in international portfolio diversification; Currency forwards versus currency options Raimond Maurer, Shohreh Valiani. Managerial Finance. Patrington: 2007. vol. 33, Iss. 9; p. 667.*

* cited by examiner

*Primary Examiner*—Frantzy Poinvil
*Assistant Examiner*—Clement Graham
(74) *Attorney, Agent, or Firm*—Saul Ewing LLP; John R. Pivnichny

(57) ABSTRACT

A system, computer code, and method are disclosed for solving optimization problems using prestored data groups pertaining to a plurality of anticipated optimization problems, whereby optimization problems can be solved much faster with fewer iterations. The method may comprise storing a plurality of data groups each associated with one of a plurality of anticipated optimization problems, each of the data groups including optimal solutions to a corresponding anticipated optimization problem; and solving the current optimization problem using the stored data groups.

2 Claims, 7 Drawing Sheets

Table 1A

| DATA_FILE_NAME | PROBLEM_TYPE | OPTIMIZATION_ALGORITHM |
| --- | --- | --- |
| portfolio 1 | stock | quadratic |
| portfolio 2 | mutual fund | quadratic |
| portfolio 3 | US bonds | linear |
| ... | | |

Table 2A

| | DATA_FILE_NAME | SOLUTION_ID | OBJECTIVE_VALUE | ADDRESS |
| --- | --- | --- | --- | --- |
| R1 | portfolio 1 | SOD14 | 12 | 1010 |
| R2 | portfolio 1 | SID15 | 13 | 1020 |
| R3 | portfolio 1 | SID16 | 15 | 1030 |
| R4 | portfolio 1 | SID17 | 18 | 1040 |
| R5 | portfolio 1 | SID18 | 22 | 1050 |
| ... | | | | |

Table 3A

| | DATA_FILE_NAME | SOLUTION_ID | EQUATION_NAME | RHS_VALUE |
| --- | --- | --- | --- | --- |
| R1 | portfolio 1 | SID14 | EQ1 | 14 |
| R2 | portfolio 1 | SID14 | EQ2 | 100 |
| R3 | portfolio 1 | SID15 | EQ1 | 15 |
| R4 | portfolio 1 | SID15 | EQ2 | 100 |
| R5 | portfolio 1 | SID16 | EQ1 | 16 |
| R6 | portfolio 1 | SID16 | EQ2 | 100 |
| R7 | portfolio 1 | SID17 | EQ1 | 17 |
| R8 | portfolio 1 | SID17 | EQ2 | 100 |
| R9 | portfolio 1 | SID18 | EQ1 | 18 |
| R10 | portfolio 1 | SID18 | EQ2 | 100 |
| ... | | | | |

FIGURE 6A

Table 1B

| DATA_FILE_NAME | PROBLEM_TYPE | OPTIMIZATION_ALGORITHM |
|---|---|---|
| diet 1 | calorie diet | linear |
| diet 2 | carbohydrate diet | linear |
| • | | |
| • | | |
| • | | |

Table 2B

| | DATA_FILE_NAME | SOLUTION_ID | OBJECTIVE_VALUE | ADDRESS |
|---|---|---|---|---|
| R1 | diet 1 | S2000 | 12 | 3010 |
| R2 | diet 1 | S2200 | 11 | 3020 |
| R3 | diet 1 | S2300 | 9 | 3030 |
| R4 | diet 1 | S2400 | 5 | 3040 |
| R5 | diet 1 | S2500 | 4 | 3050 |
| | • | | | |
| | • | | | |
| | • | | | |

Table 3B

| | DATA_FILE_NAME | SOLUTION_ID | EQUATION_NAME | RHS_VALUE |
|---|---|---|---|---|
| R1 | diet 1 | S2000 | EQ10 | 2000 |
| R2 | diet 1 | S2000 | EQ11 | 100 |
| R3 | diet 1 | S2200 | EQ10 | 2200 |
| R4 | diet 1 | S2200 | EQ11 | 100 |
| R5 | diet 1 | S2300 | EQ10 | 2300 |
| R6 | diet 1 | S2300 | EQ11 | 100 |
| | • | | | |
| | • | | | |
| | • | | | |

FIGURE 6B

SYSTEM AND METHOD OF SOLVING OPTIMIZATION PROBLEMS USING PRESTORED ADVANCED BASES

RELATED APPLICATIONS

The present application relates to a copending U.S. patent application Ser. No. 09/460,608 entitled "Internet-Based System For Calculating Optimal Equity Portfolios," filed on Dec. 14, 1999, hereby fully incorporated by reference, and to a copending U.S. patent application entitled "System and Method of Automatically Rebalancing Portfolios by Single Response," concurrently filed with the present application on Oct. 10, 2000, hereby fully incorporated by reference.

BACKGROUND OF THE INVENTION

1. Field of the Invention

The present invention relates to a system, code and method for solving different optimization problems using a library of prestored data groups (or "advanced bases") pertaining to anticipated optimization problems.

2. Description of the Related Art

Various types of optimization software packages are available for solving optimization problems that parallel real life problems. Typically, such software packages include sophisticated computer programs that solve mathematical equations which are in essence modeled after the real life problems to be solved. By solving the equations, solutions to the actual problems are suggested.

Solving different optimization problems may require the use of different types of algorithms, such as the quadratic, linear or integer algorithm well known in the art. A quadratic optimization problem is an optimization problem requiring the use of the quadratic algorithm, whereas an integer/linear optimization problem is an optimization problem requiring the use of the integer/linear algorithm. Quadratic optimization problems generally can be represented in the following mathematical algorithm:

Minimize $xCx$ subject to: $Ax=b$ where $x \geq 0$       (Equation 1)

wherein C is a cost matrix, x is a column vector (variable to be solved for), A is an array of coefficients (matrix) representing constraints, and b is a RHS (Right Hand Side) column vector representing constraints. A typical quadratic optimization problem might involve, for example, determining a list of financial assets that minimizes the variance of a financial portfolio at a given return. This problem may be solved using above Equation (1) by defining the terms as follows:

x: % of given stock in portfolio,

A: matrix with certain coefficients representing stock composition requirements, b: vector representing the minimum rate of return, and C: covariance matrix representing rate of return relations between different stocks. Linear and integer optimization problems generally involve solving the following mathematical algorithm:

Minimize $Cx$ subject to: $Ax=b$ where $x \geq 0$       (Equation 2)

wherein C is a vector representing costs per unit, x is a column vector, A is an array of coefficients (matrix) representing constraints, and b is a RHS (Right Hand Side) column vector representing constraints. In linear optimization problems, x in Equation (2) represents real numbers, whereas in integer optimization problems, x represents only the integers. The task of determining the exact amount and types of foods that a user can consume to satisfy certain nutritional requirements at minimum food costs is an example of a linear optimization problem. In situations where the units of interest cannot be divided into parts, the integer optimization model is utilized. For example, an integer optimization problem could be used in a personnel scheduling task wherein a determination must be made as to a minimum number of workers who must work during each shift at the lowest possible cost, given a number of expected customers, workers' desired schedules, and other factors. Since a person cannot be divided into parts, workers must be represented as integers.

In solving these types of optimization problems, conventional optimization methods generally start the calculations using basic "starting data" (e.g., all zeros) and iterate the same calculations on resultant data until an optimal solution is obtained. For example, in U.S. Pat. No. 6,031,984 to Walser, which is herein fully incorporated by reference, optimization problems are solved by initializing the variables of a constraint model and iterating certain calculations using the constraint model until an optimal solution is found.

Although these conventional methods may be acceptable in solving simple optimization problems, a problem arises if a more complex optimization problem needs to be solved. A complex optimization problem generally requires a large number of iterations and solving multiple equations before an optimal solution to the problem can be found. Thus, depending on the type of problem and basic starting data, the processing time for the conventional methods can be extremely long. In user-interactive systems that require timely responses, such as Internet-based systems, the conventional methods are thus unable to provide solutions to optimization problems in a timely manner.

In view of the above and other problems with conventional optimization methods, a need exists for a technique by which more efficient and timely optimization computations can be performed. A further need exists for a technique that minimizes the time required to find optimal solutions to an optimization problem, especially in user-interactive applications such as Internet-based applications.

SUMMARY OF THE INVENTION

The present invention allows different optimization problems to be solved with fewer iterations and improved response time. In a preferred embodiment, a predetermined number of anticipated optimization problems and calculations that are typically performed in solving them are presolved. Data associated with and derived from these calculations, e.g., anticipated input values, intermediate calculation values and optimal solutions to the anticipated problems, are stored in a database or the like. The prestored data in the database are used to reduce the processing time involved in obtaining optimal solution(s) to a current optimization problem to be solved.

Accordingly, an object of the present invention is to provide a system, computer code and method of solving optimization problems with fewer iterations and improved response time.

Another object of the present invention is to provide a system, computer code and method of solving optimization problems using pre-stored data groups pertaining to a plurality of anticipated optimization problems.

A further object of the present invention is to provide a system, computer code and method of solving optimization problems with the use of quadratic, linear or integer algorithms.

Briefly described, the present invention is directed to a computer-implemented method for solving a current optimization problem, comprising the steps of storing a plurality of data groups each associated with one of a plurality of anticipated optimization problems, each of the data groups including optimal solutions to a corresponding anticipated optimization problem; and solving the current optimization problem using the stored data groups.

The present invention is further directed to a system for solving a current optimization problem, comprising a storage unit for storing a plurality of data groups, each of the data groups associated with one of a plurality of anticipated optimization problems and including optimal solutions to the associated anticipated optimization problem; and an optimization unit for solving the current optimization problem using the stored data groups.

Furthermore, the present invention is directed to computer readable code stored on media, for solving an optimization problem, comprising first subprocesses for storing a plurality of data groups each associated with one of a plurality of anticipated optimization problems, each of the data groups including optimal solutions to a corresponding anticipated optimization problem; and second subprocesses for solving the current optimization problem using the plurality of data groups.

Other objects and advantages of the present invention will be set forth in part in the description and the drawings which follow, and, in part, will be obvious from the description or may be learned by practice of the invention.

BRIEF DESCRIPTION OF THE DRAWINGS

FIGS. 6A and 6B respectively illustrate examples of look-up tables pertaining to stock portfolio optimization problems and calorie diet optimization problems.

DETAILED DESCRIPTION OF THE PREFERRED EMBODIMENTS

In the present invention, an "optimal solution" to an optimization problem is defined as the value (or a group of values) being solved for in the equation (s) representing the problem. For example, in the simplest form, assume an optimization problem which is represented by only one equation: $Ax=b$, wherein A and b are known or given. To solve the optimization problem, this equation is solved for the value(s) of "x" that will satisfy the equation given A and b. In this simple example, the value(s) of "x" represent the "optimal solution" to the optimization problem.

Figure 1:
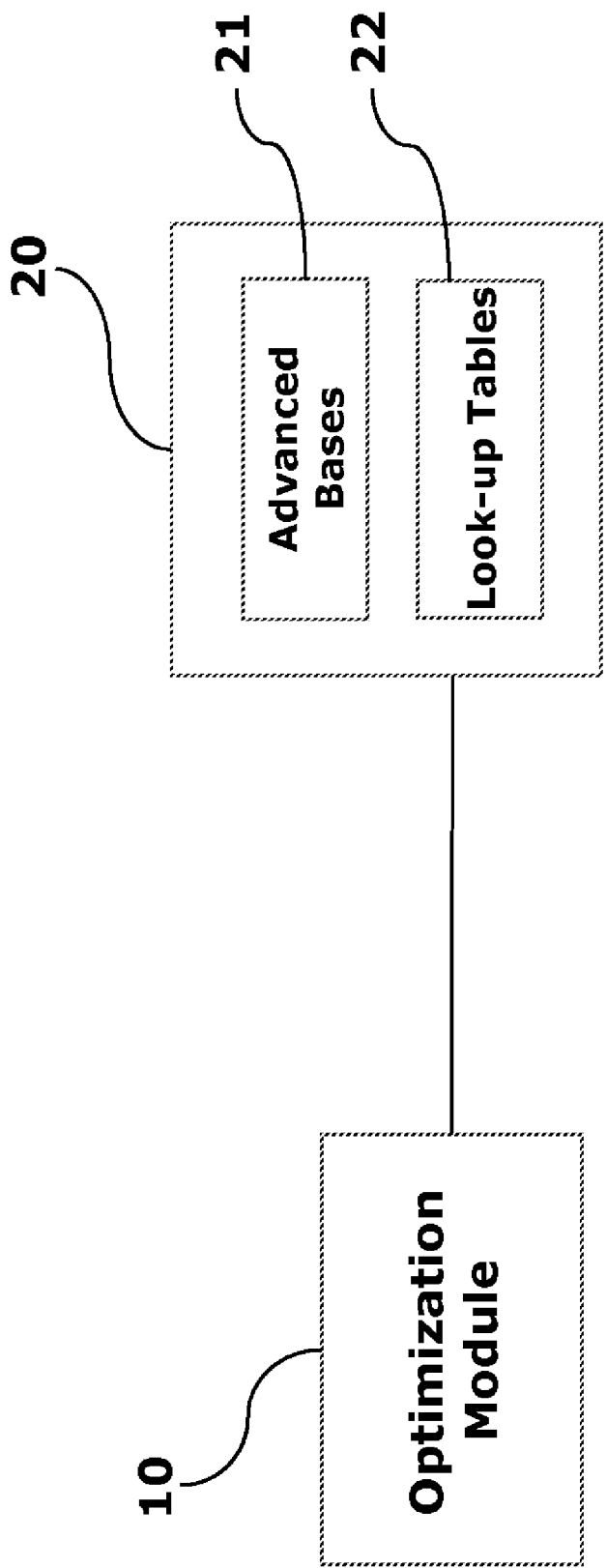
FIG. 1 is a block diagram of a system for solving optimization problems according to a preferred embodiment of the present invention.

FIG. 1 illustrates a system for solving optimization problems according to a preferred embodiment of the present invention. As illustrated in FIG. 1, the system includes an optimization module 10 and a database 20, operatively connected to each other. Although not illustrated, the system may include any other modules or elements that are generally included in conventional optimization software products, e.g., a simulation module. The present system can be incorporated into any system which requires optimization problems to be solved; for example, the present system may be incorporated into a financial analysis system requiring portfolio optimization, such as that disclosed in U.S. Pat. No. 5,918,217 to Maggioncalda et al., which is herein fully incorporated by reference.

The optimization module 10 may include an optimization software product well known in the art, e.g., OSL (Optimization Subroutine Library) from IBM, CPLEX, or any other means for solving optimization problems. Initially as a setup, the optimization module 10 may be pre-programmed to incorporate therein all assumptions and related data, which may be necessary to successfully implement the processing steps of the present invention. In a preferred embodiment, a library of "advanced bases" 21 and a plurality of look-up tables 22 are stored in the database 20. An "advanced basis" is a group of data pertaining to a particular anticipated optimization problem to be pre-solved, e.g., the description of the anticipated problem and the type of algorithm used to solve the problem, constraints, RHS values, input values, intermediate calculation values and optimal solution(s) pertaining to the anticipated problem. That is, each advanced basis includes any data which may be necessary to solve a particular anticipated optimization problem and the optimal solution (s) to the problem. If the optimization module 10 includes OSL, then DSPACE (memory images) of OSL may be utilized to obtain advanced bases.

The look-up tables 22 stored in the database 20 provide parameters used by the optimization module 10 to select an appropriate advanced basis from the database 20. It should be understood that there exist a variety of different parameters which may be employed in the tables 22 to select the appropriate advanced basis. For example, advanced bases can be identified using parameters, such as a pre-solved problem name, pre-solved problem type (e.g., stock problem, calorie diet problem, etc.), algorithm type (e.g., quadratic or linear/integer algorithm), objective values (numerically representing the objectives or objective functions of the pre-solved problem), objective type (indicating the type of objective, e.g., to maximize or to minimize), solution ID (identifying the solution(s) to the pre-solved problem), advanced basis address (indicating the address in the database 20 where the advanced basis is stored), RHS values (constraint values), and/or equation names (identifying equations used to pre-solve the problem). In addition, look-up tables for converting descriptive equation names into row and column numbers can be provided to save memory space.

Figure 2:
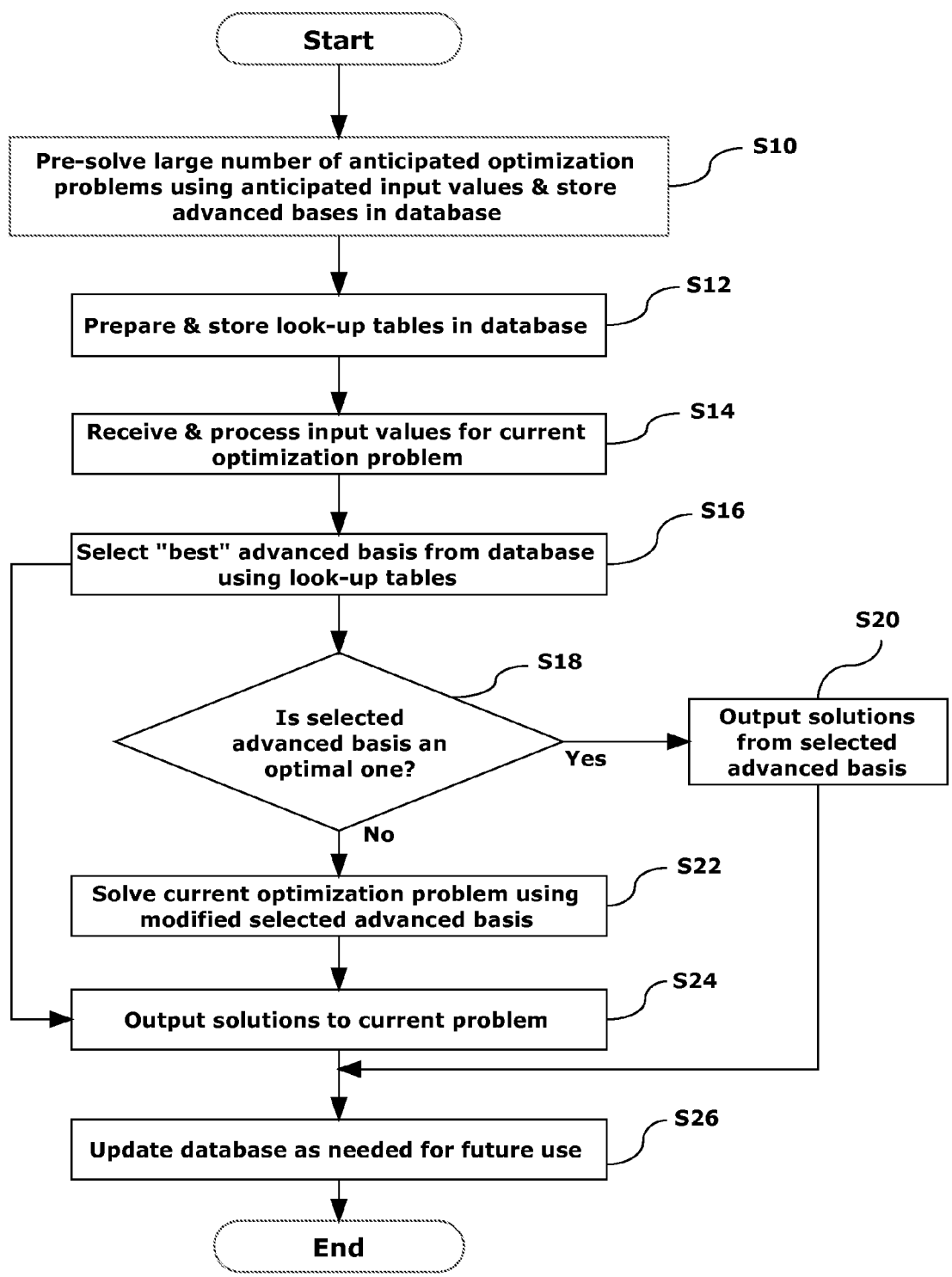
FIG. 2 is a flowchart illustrating the processing steps of a method of solving optimization problems according to a preferred embodiment of the present invention.

FIG. 2 is a flowchart illustrating the processing steps of a method for solving optimization problems according to a preferred embodiment of the present invention. All of the processing steps may be executed by the optimization module 10 or the like. As illustrated in FIG. 2, initially, any number of anticipated optimization problems are pre-solved by solving predetermined equations using certain anticipated input values via conventional iterative processes in Step S10. The anticipated input values may include any data which may be input by a user. For example, in a portfolio optimization scenario, the input data may include a preferred return level on a particular investment. Once the anticipated problems are pre-solved, an advanced basis for each pre-solved problem is compiled and stored in the database 20. A library of advanced bases pertaining to the different types of optimization problems and different optimization algorithms may be stored in one database 20.

In Step S12, look-up tables are prepared based on the advanced bases and are stored in the database 20. The look-up tables 22 provide parameters which may be used by the module 10 or the like to identify an appropriate advanced basis in the database 20.

In Step S14, inputs from a user pertaining to a current optimization problem to be solved are received and processed by the system of FIG. 1. The user may enter the input values via any known input unit (e.g., a keyboard, a mouse, a touch screen) and transmit them via any known communications method (e.g., the Internet). In a preferred embodiment, in processing the user's inputs, the system is programmed to recognize based on the received user's inputs, the type of optimization problem currently being presented (e.g., stock problem, mutual fund problem, et.) and the optimization algorithm (quadratic or linear/integer) to be used to solve the current problem. For example, in a financial portfolio optimization scenario wherein a financial Web site or a financial Kiosk may be coupled to the system of FIG. 1, a user may identify to the Web site or Kiosk using an input unit that he wishes to "maximize his current return on his stock portfolio at a given risk level." The user may further transmit user's preferred stocks, retirement age, desired risk level, etc. to the Web site or Kiosk. Based on this information, the system of FIG. 1 determines that the type of problem currently being presented is a stock problem and that the optimization algorithm which may be used to solve the current problem is the quadratic optimization algorithm, since this particular type of problem is known in the art to require the use of the quadratic optimization algorithm. The optimal solution to the current problem is a list of stocks that maximizes the user's return at the given risk level. In the alternative, it may be possible to have a stock problem requiring the use of linear/integer algorithm depending on its applicability, in which case, the system would also be programmed to make this determination based on the user's input.

In Step S16, one "best" advanced basis is selected from the stored advanced bases 21 based on predetermined criteria using the look-up tables 22. In a preferred embodiment, the predetermined criteria for selecting the best advanced basis can differ based on the problem type and optimization algorithm identified by the system, and are further discussed later referring to FIG. 3. In rare cases where none of the stored advanced bases 21 are selectable as the best advanced basis, the current problem is solved conventionally and the method proceeds to Step S24. Otherwise, in Step S18, it is determined whether or not the selected advanced basis is an optimal advanced basis. Different optimality criteria may be used depending on the type and/or objective of the current problem being presented and the optimization algorithm to be used to solve the current problem. For example, given that the current problem is a quadratic stock portfolio optimization problem for maximizing the return at a given variance, the optimality of the selected advanced basis may be tested by determining whether or not the variance of the selected advanced basis falls within a predetermined tolerance range, to ensure that the optimal selected advanced includes a variance which is "sufficiently close" to the desired variance. In a preferred embodiment, the criteria for determining whether or not the selected advanced basis is optimal are generally predetermined by the programmer and pre-programmed into the system.

If the selected advanced basis is determined to be optimal, then the optimal solution(s) included in the selected advanced basis are output as the optimal solution(s) to the current problem in Step S20. If it is not optimal, then in Step S22, the selected advanced basis is modified using a half interval search or other search methods well known in the art and the current problem is iteratively solved using the modified advanced basis as the basic starting data. The resultant optimal solutions are output to the user in Step S24. In Step S26, the advanced basis pertaining to the current problem is stored in the database 20 if such advanced basis has not been included in the database 20. The look-up tables 22 are also updated to identify the new advanced basis. Once stored in the database 20, the new advanced basis can be used to solve subsequent optimization problems.

Figure 3:
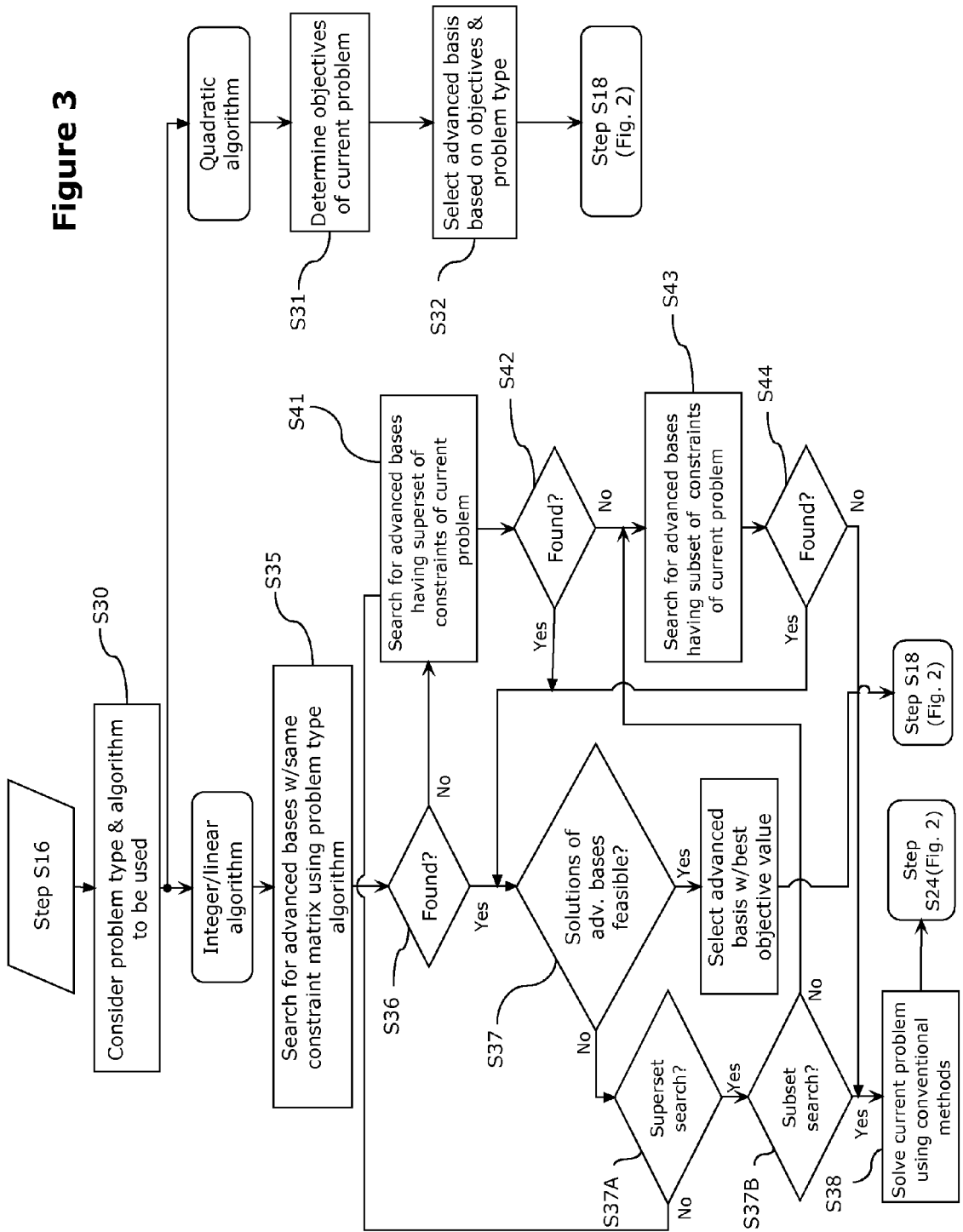
FIG. 3 illustrates sub-steps involved in Step S16 of FIG. 2 according to a preferred embodiment of the present invention.

FIG. 3 illustrates the sub-steps involved in Step S16 according to a preferred embodiment of the present invention. Referring to FIG. 3, to implement Step S16, the type of current optimization problem and the optimization algorithm identified in Step S14 are considered by the system in Step S30. If the system has identified that solving the current problem requires the use of linear/integer optimization algorithm (Step S14), then in Step S35, the database 20 is searched for advanced bases having a constraint matrix which is identical to the constraint matrix of the current problem, based on the identified problem type and optimization algorithm. A constraint matrix is an array of coefficients representing constraints, which is used in Equation (2) discussed above, and numerically identifies certain characteristics of an optimization problem (e.g., upper and lower limits for an optimal solution). In a preferred embodiment, generally a constraint matrix is known based on the type of problem to be solved and the type of optimization algorithm to be used to solve the problem. Thus, appropriate advanced bases can be selected based on the identified problem type and optimization algorithm. For example, if the system recognizes that the current problem is a linear loan application (problem type=loan problem; algorithm type=linear), then all advanced bases directed to linear loan optimization problems will have the same constraint matrix and, as a result, all advanced bases directed to such loan optimization problems can be searched and selected from the database 20.

If advanced bases with the same constraint matrix are found in Step S36 (indicating that at least few characteristics of the current problem as represented in the constraint matrix are the same as those of the pre-solved problems), it is determined whether or not any of the optimal solutions (pertaining to the pre-solved problems) included in the located advanced bases are feasible solutions in Step S37. Feasible solutions are solutions that satisfy all of the constraints represented in the constraint matrix and RHS vector. Step S37 ensures that the solutions to the current problem are solutions that are feasible in real life. In a preferred embodiment, Step S37 may be implemented as a user-defined function (UDF) of the database 20. The use and operation of user-defined functions are described in a copending application, U.S. application Ser. No. 09/516,514, entitled "Technique For Data Mining Of Large Scale Relational Databases Using SQL," filed on Mar. 1, 2000, which is herein fully incorporated by reference. Implementing Step S37 as a user-defined function allows multiple processors to check solutions and other data in parallel, whereby the response time of the module 10 can be significantly improved.

If advanced bases with feasible solutions are found in Step S37, then an advanced basis with the "best" objective value is selected from the located advanced bases in Step S39. The "best" objective value may be the lowest objective value if the current problem is a minimizing type problem, and the highest objective value if the current problem is a maximizing type problem. This selection step helps to locate solutions that satisfy the objectives of the current problem. After Step S39, the method proceeds to Step S18 discussed above.

In Step S36, if no advanced bases with the same constraint matrix can be found, then the database 20 is searched for all advanced bases having a "superset" of the constraints of the current problem (i.e., all the constraints of the current problem and some additional constraints) in Step S41. This search is defined hereinafter as a "superset" search. If the advanced bases with the "superset" of the constraints are found in Step S42, then the method proceeds to Step S37 discussed above. If not, then the database 20 is searched for advanced bases having a "subset" of the constraints of the current problem (i.e., some of the constraints of the current problem) in Step S43. This search is defined hereinafter as a "subset" search. Both the "superset" and "subset" searches are provided in an effort to locate an advanced basis of a pre-solved problem which is similar to the current problem type. If the advanced bases with the "subset" of the constraints are found in Step S44, then the method proceeds to Step S37; otherwise, it is presumed that the current problem cannot be solved using the prestored advanced bases and the method proceeds to Step S38 wherein the current problem is solved using conventional problem solving methods. Then the method returns to Step S24 in FIG. 2.

In Step S37 if it is determined that the solutions of the located advanced bases are not feasible solutions, then Steps S37A and S37B may be performed. Steps S37A and S37B are applicable in situations where the located advanced bases may have the same constraint matrix as the current problem but do not necessarily have the feasible solutions. In which case, it is determined whether the "superset" search has been conducted in Step S37A and, if this search has not been conducted, then the method proceeds to Step S41 to conduct the "superset" search. However, if the "superset" has been conducted, then it is determined whether or not the "subset" search has been conducted in Step S37B. If the "subset" search has not been conducted, then the method proceeds to Step S43 wherein this search is conducted. However, if the "subset" search has been conducted, then it is presumed that the current problem cannot be solved using the prestored advanced bases, and the method proceeds to Step S38.

On the other hand, in Step S30 if the current problem is considered to be a quadratic optimization problem, then the objectives (i.e., desired outcome) of the current problem are determined in Step S31. Here, because of the nature of quadratic optimization problems, the objectives of the current problem are determined up front for an immediate use, whereas in linear/integer optimization problems, such a determination is made later (e.g., in Step S39) because there, the objectives of the problem are utilized after the feasible solutions have been identified (in Step S37). In a preferred embodiment, the objective of the current quadratic optimization problem may be determined by the system based the user's input. In fact, the system may be pre-programmed to automatically recognize or determine the objective of the quadratic optimization problem based on the user's input. For example, in the quadratic stock portfolio optimization scenario, the user's input identifying that he wishes to "maximize" his current return on his stock portfolio would automatically indicate to the system that the objective of the current problem is to "maximize" the current return. Once the objective of the problem is determined, this information is used in Step S32 to select an appropriate advanced basis from the database 20 using the look-up tables 22. Thereafter, the method proceeds to Step S18 in FIG. 2.

Figure 4:
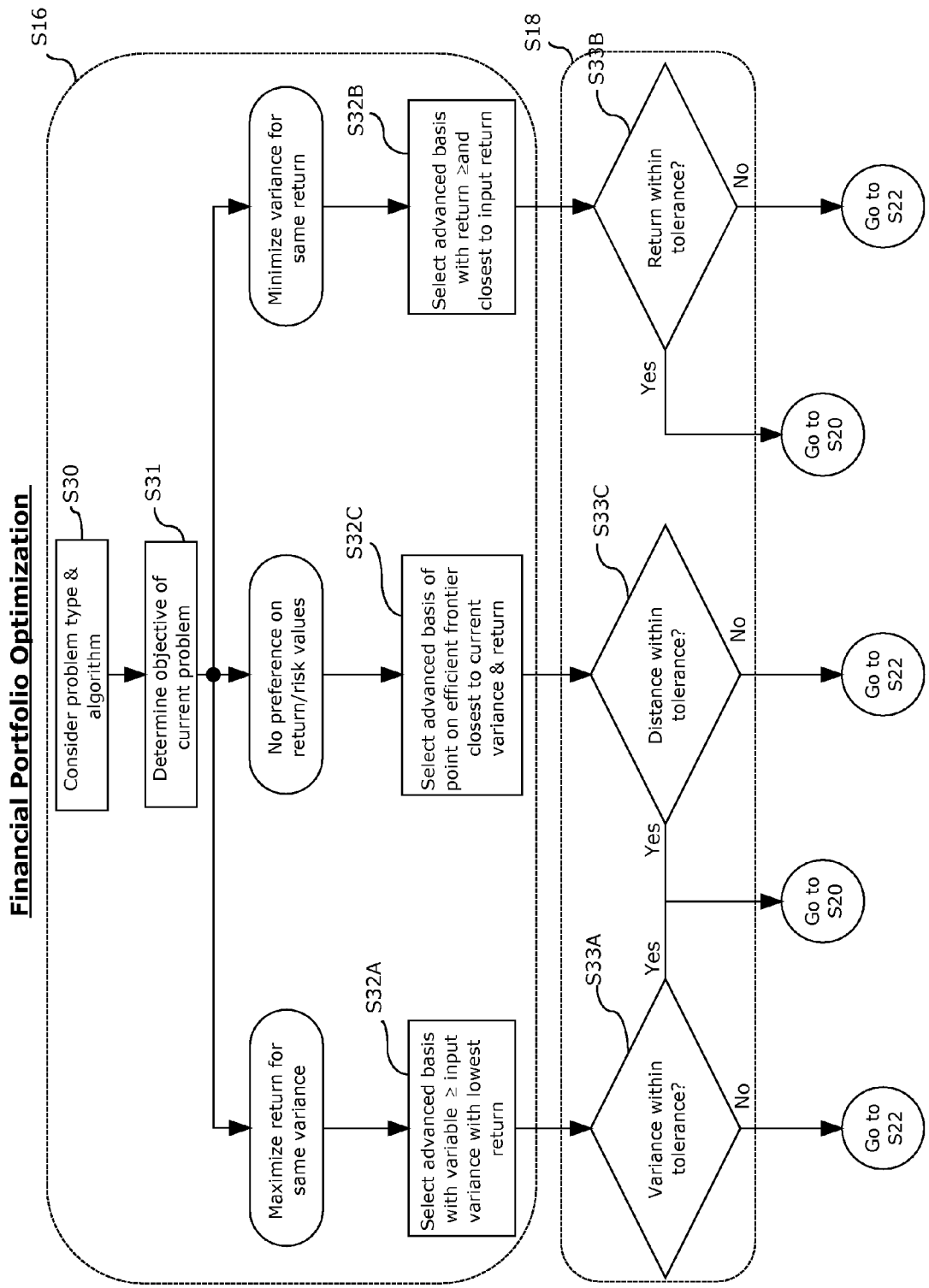
FIG. 4 illustrates examples of implementation steps for Steps S16 and S18 of FIG. 2 for use in solving quadratic financial portfolio optimization problems according to a preferred embodiment of the present invention.

Having described the processing steps of the method referring to FIGS. 2 and 3, an example is now described referring to FIG. 4 for the sole purpose of illustrating how Steps S16 and S18 in FIG. 2 may be implemented for solving quadratic financial portfolio optimization problems. FIG. 4 illustrates examples of implementation steps corresponding to Steps S16 and S18. It should be understood that the steps shown in FIG. 4 are illustrated only for the purpose of providing one example of implementation, and that a variety of different ways to implement Steps S16 and S18 can be utilized as long as they select and test an appropriate advanced basis based on the criteria discussed in connection with Steps S16 and S18. Steps S30-S32C in FIG. 4 correspond to Step S16 in FIG. 2, whereas Steps S33A-33C in FIG. 4 correspond to Step S18 in FIG. 2.

Referring to FIG. 4, in financial portfolio optimization scenarios, the problem type, the optimization algorithm to be used, and the objective of a current optimization problem are determined and considered in Steps S30 and S31 as discussed above. If it is determined that the main objective of the current problem is to maximize the return on a financial portfolio while maintaining the current variance level, Step S32A may be performed. In Step S32A, according to a preferred embodiment an advanced basis with the lowest return and the variance greater than or equal to the input variance, is selected from the database 20 using the look-up tables 22. By selecting the advanced basis with the lowest return when the objective of the problem is to maximize the return, the system can perform in a subsequent step (e.g., in Step S22) iterations by incrementation (rather than decrementation) to solve the problem, i.e., the return value can be incremented until a desired maximum return can be located. In the alternative, although not illustrated, an advanced basis with the variance which is less than the input variance and with the highest return may be selected. In which case, the return value of the selected advanced basis can be iteratively decremented in subsequent Step S22 until a desired maximum return value can be obtained.

In Step S33A, it is determined whether the variance of the selected advanced basis falls within a predetermined tolerance range (e.g., 005%) of the desired variance. This determination ensures that the variance is maintained at the input variance level. If it is, then the method proceeds to Step S20 in FIG. 2 discussed above; otherwise, the method proceeds to Step S22 in FIG. 2 discussed above, wherein a half interval search or other search methods may be used to modify and find an advanced basis having an output variance that falls within the tolerance range for solving the current problem based on the modified advanced basis.

If, however, the main objective of the current problem is to minimize the variance of a financial portfolio at a current return level, then Step S32B may be performed. In Step S32B, an advanced basis with a return level which is greater than or equal to and closest to the input return level, is selected from the database 20 using the look-up tables 22. Then in Step S33B, it is determined whether the return of the selected advanced basis falls within a predetermined tolerance range (e.g., 005%) of the input return (current return level). This determination ensures that the output return is maintained at the input return level. If it is, then the method proceeds to Step S20 discussed above; otherwise, the method proceeds to Step S22 discussed above, wherein a half interval search or other search methods may be used to modify and find an advanced basis having an output return that falls within the tolerance range for solving the current problem based on the modified advanced basis.

If the objectives of the current problem do not identify a desired return or risk level, then Step S32C may be performed wherein the points on the "efficient frontier" can be utilized. The "efficient frontier" is defined as a series of points each representing an optimal combination of feasible risk and return. Any point on the efficient frontier offers the minimum risk for a given rate of return. In Step S32C, the advanced basis pertaining to a point on the efficient frontier which is closest to the user's current point (representing current risk and return level), is searched and selected from the database 20. Once the closest point on the efficient frontier is selected from the database 20, in Step S33C it is determined whether the distance between the selected point and the current point falls within a predetermined tolerance range. If it is, then the method proceeds to Step S20 discussed above; otherwise, the method proceeds to Step S22 discussed above, wherein a half interval search or other search methods may be used to modify and find an advanced basis having a distance to the current point that falls within the tolerance range for solving the current problem based on the modified advanced basis.

Figure 5:
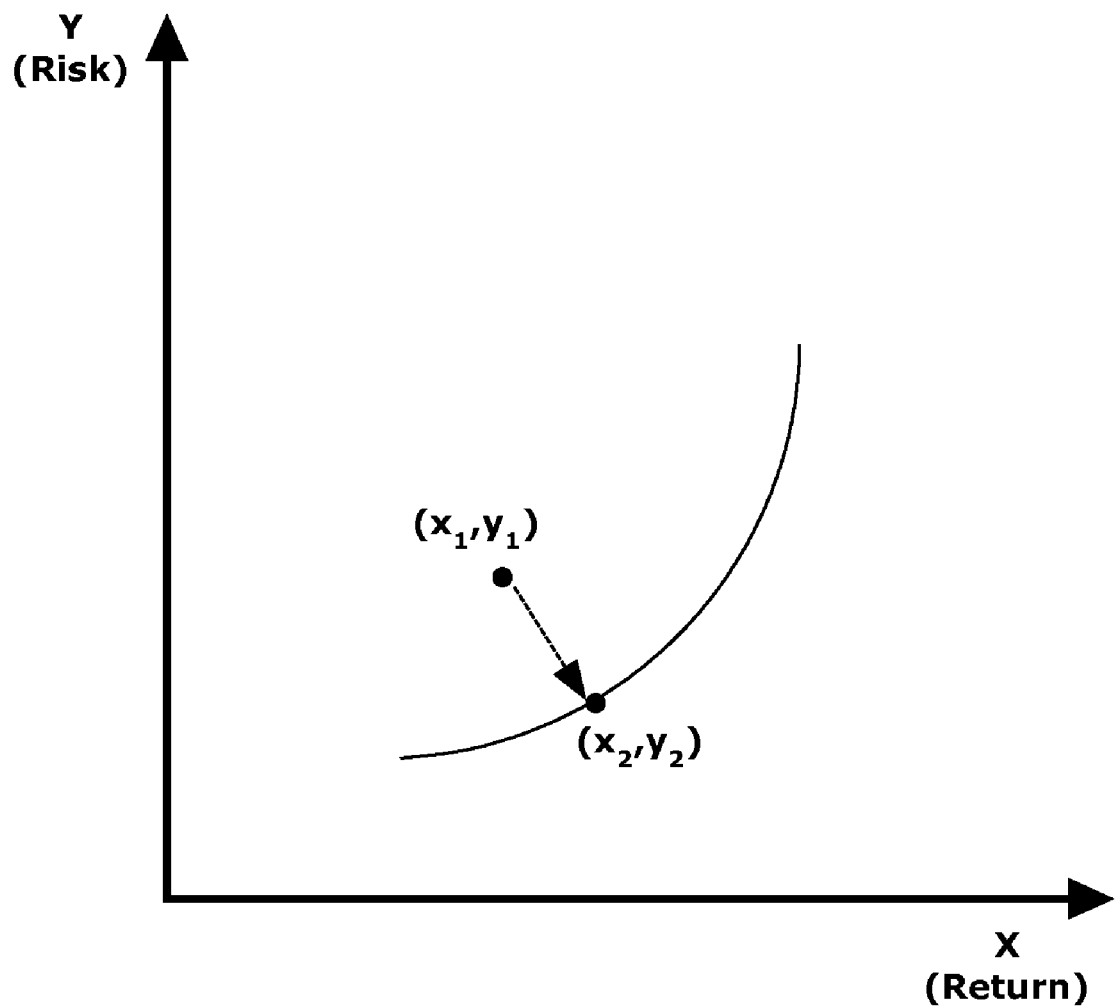
FIG. 5 illustrates an example of a graph of the efficient frontier for financial portfolio optimization problems.

FIG. 5 illustrates an example of a graph of the efficient frontier provided for enhancing the understanding of Step S32C of FIG. 4. As illustrated in FIG. 5, a distance, d, between two risk/return points $(x_1, y_1)$ $(x_2, y_2)$ can be calculated using the well known Euclidian distance equation:

$$d=\sqrt{(x_1-x_2)^2+(y_1-y_2)^2}$$ (Equation 3)

This equation may be utilized in performing Step S32C. For example, given the user's current risk/return point $(x_1, y_1)$, the risk/return point $(x_2, y_2)$ on the efficient frontier that is closest to the current point $(x_1, y_1)$ can be found by calculating the distance, d, between the current point $(x_1, y_1)$ and each of the points on the efficient frontier and selecting a point on the efficient frontier which provides the minimum distance.

Having described the implementation steps of FIG. 4, three examples of stock portfolio optimization problems are now discussed for enhancing the understanding of these steps referring to exemplary look-up tables (Table 1A, Table 2A, and Table 3A) as shown in FIG. 6A, which may be stored in the database 20. Table 1A is a look-up table identifying a series of "data file names" each of which is associated with a "problem type" and an "optimization algorithm." Each data file name (e.g., "portfolio 1") identifies a data file in which is stored pre-solved calculation information (advanced bases) obtained using the associated optimization algorithm (e.g., "quadratic" for data file "portfolio 1") and pertaining to optimization problems of the associated problem type (e.g., "stock" problem for data file "portfolio 1"). Table 2A is a look-up table identifying a series of "solution IDs" contained in each of the data files, and the "objective value" and "address" associated with each of the "solution IDs." As noted above, the "solution IDs" identify the solution(s) included in the advanced bases associated with the data files, the "objective values" are numerical values representing the objectives of the pre-solved problems, and the "address" identifies the address where the associated advanced basis is stored in the database 10. In Table 2A, each solution ID (e.g., "SID14") is associated with a data file (e.g., "portfolio 1" for solution ID "SID14"), an objective value (e.g., "12" for solution ID "SID14") of the pre-solved problem to which the solution ID pertains, and an address (e.g. "1010" for solution ID "SID14") wherein an advanced basis having the solution identified by the solution ID is stored in the database 10. Table 3A is a look-up table associating each solution ID of a data file name with an "equation name" and a "RHS value." As noted above, "equation names" identify different equations used to pre-solve different optimization problems, and "RHS values" identify various constraints included in the pre-solved problems. In Table 3A, each solution ID of a data file (e.g., solution ID "SID14" of data file name "portfolio 1") can be identified using the names of equation (s) (e.g., "EQ1" or "EQ2") employed to calculate the solution identified by the solution ID ("SID14") and the RHS value (e.g. "14" or "100") identifying the constraints of the pre-solved problem. In all three stock portfolio examples below, it is assumed that the system has been configured to recognize that the equation name "EQ1" identifies the equations specifically pertaining to the types of stock portfolio optimization problems presented below.

Stock Portfolio Example 1

In the first example, assume that the current optimization problem involves maximizing the return on a stock portfolio while maintaining the current variance level of 14% (i.e., the "objective value" is 14%). As noted above, the system is pre-programmed to identify the type of current optimization problem to be solved, the optimization algorithm to be used, and the objective of the current problem based on the user's inputs and/or the field of application. Thus, the system recognizes that the current problem is a "stock" problem requiring the use of the "quadratic" optimization algorithm and that the objective is to obtain a maximum return with the same (14%) variance (Steps S30 and S31 in FIG. 4).

Based on this information pertaining to the current problem, an advanced basis with a variance which is greater than or equal to the input variance (i.e., 14%) and with the lowest return is selected (Step S32A of FIG. 4). This can be accomplished as follows. Look-up table 1A of FIG. 6A is searched for a problem type identified as "stock" and having the optimization algorithm identified as "quadratic." The first entry in Table 1A satisfies this criteria, and this identifies a data file named "portfolio 1" as the file containing the pre-solved advanced bases information for this type of optimization problem and algorithm. Table 2A is searched for rows having the data file name of "portfolio 1" and the objective value (representing a variance of 14% in this example) which is greater than or equal to the desired objective. As a result, rows R3, R4 and R5 of Table 2A are initially selected, since they have the objective values of 15%, 18% and 22%, respectively. From Table 2A it can be determined that the solutions associated with the objective values 15%, 18%, and 22% are identified as solution IDs "SID16", "SID17" and "SID18," respectively. Table 3A is searched for rows with the same solution ID (SID16, SID17 or SID18) and the lowest RHS value (i.e., lowest return) given the equation name "EQ1," whereby row R5 is selected from Table 3A. Row R5 is associated with the solution ID "SID16"; therefore among the initially selected rows R3-R5 of Table 2A, row R3 (also associated with the solution ID "SID16") is finally selected as identifying the address of the most appropriate solution. The advanced basis associated with row R3 of Table 2A is then considered to be the best advanced basis for this problem, and the address "1030" in row R3 is used to retrieve this advanced basis from the database 20. At this point, the process of step S32A is concluded, and the process moves on to Step S33A as described above. If it is determined in Step S33A that the output variance of the selected advanced basis does not fall within a predetermined tolerance range, then the process moves on to Step S22 discussed above, wherein the current problem may be solved by iteratively incrementing the return of the selected advanced basis until a maximum return is obtained. Otherwise, the process proceeds to Step S20 as discussed above.

Stock Portfolio Example 2

In the second example, assume that the portfolio optimization problem involves minimizing the variance of the portfolio at the current return level of 15.5%. Similar to Example 1, it is assumed that the system has been programmed to recognize the problem type, the optimization algorithm, and the objective of the current problem and thus, the system identifies that the current problem is a "stock" problem requiring the use of the "quadratic" optimization algorithm and that the objective is to obtain a minimum variance with the same (15.5%) return level (Steps S30 and S31 in FIG. 4). Based on this information, an advanced basis is selected which includes a return greater than or equal to and closest to the input variance (15.5%) (Step S32B of FIG. 4). This can be accomplished as follows. Table 1A is searched for the problem type of "stock" and the optimization algorithm of "quadratic," whereby the data file named "portfolio 1" is identified as discussed above. Then Table 3A is searched for rows with the data file named "portfolio 1" and the RHS value which is greater than or equal to and closest to the input return (15.5%) given the equation name "EQ1." The parameter, RHS value, is utilized in this search since, in this example, it represents the return level. As a result of this search, row R5 is selected which identifies that the appropriate solution has the solution ID of "SID16". Table 2A is searched for a row with the same solution ID (SID16) and thus row R3 is selected. The advanced basis associated with row R3 in Table 2A is then considered to be the best advanced basis for this problem, and is retrieved from the database 20 based on the address "1030" identified in row R3. This completes the process of Step S32B and the process moves on to Step S33C as discussed above.

Stock Portfolio Example 3

In the third example, assume that the current variance (risk) and return on a user's stock portfolio are at 15.5% and 12%, respectively, and the user has not identified his preference on the desired variance or return level, but instead wishes to have the system determine the efficient frontier given the current values. Given the same assumptions as Examples 1 and 2 above, the system recognizes that the current problem is a "stock" problem requiring the use of the "quadratic" optimization algorithm and that the objective is to find a point on the efficient frontier which is closest to the current variance and return, 15.5% and 12% (Steps S30 and S31 in FIG. 4). Based on this information, an advanced basis is selected by calculating Euclidian distances using Equation (3) as discussed above, wherein the selected advanced basis pertains to a point on the efficient frontier which is closest to the current variance and return point (Step S32C of FIG. 4). This can be accomplished as follows. Table 1A is searched for a data file with the problem type "stock" and the optimization algorithm "quadratic," which results in the selection of the data file named "portfolio 1" as discussed above. Table 2A is searched for rows identifying the same data file named "portfolio 1" and thus, rows R1-R5 are selected. To obtain the $(x_1-x_2)^2$ component of Equation (3), the objective value (which represents "$x_2$" in Equation (3)) associated with each of the selected rows R1-R5 is subtracted from the current variance of 15.5% (representing "$x_1$") and the resultant difference is squared. For example, applying this calculation to row R1 which identifies the objective value of "12", the calculation of $(15.5-12)^2$ is performed to obtain the resultant value, 12.25. To obtain the $(y_1-y_2)^2$ component of Equation (3), Table 3A is searched for rows identifying the data file named "portfolio 1" and the equation named "EQ1" (which is given) and thus, rows R1, R3, R5, R7 and R9 are identified. The RHS value (representing "$y_2$") identified in each of these selected rows in Table 3A is subtracted from the current return level "12" (representing "$y_1$") and the resultant difference is squared to find $(y_1-y_2)^2$. For example, applying this calculation to row R1 of Table 3A, which identifies the RHS value of "14", the calculation of $(12-14)^2$ is performed and the resultant value of 4 is thereby obtained. Since the solution ID (SID14) of row R1 in Table 3A is identical to the solution ID (SID14) of row R1 in Table 2A, the calculation values ("12.25" obtained from the calculation of $(x_1-x_2)^2$ for row R1 of Table 2A and "4" obtained from the calculation of $(y_1-y_2)^2$ for row R1 of Table 3A) are added and square-rooted according to Equation (3) to obtain the Euclidian distance of 4.03 between the current point and a point on the efficient frontier identified by the solution ID "SID14." Similarly, the Euclidian distances are calculated for rows R2, R3, R4 and R5 in Table 2A. Among the calculated Euclidian distances, the row in Table 2A, which provides the smallest Euclidian distance, is finally selected and the advanced basis associated with that row is selected to be the best advanced basis for the current problem. At this point, the process of Step S32C is completed and the process is continued with Step S33C as described above.

Calorie Diet Example

The following provides an example of how the sub-steps of Step S16 may be applied in solving a linear, calorie diet optimization problem. This discussion refers to the sub-steps of FIG. 3 pertaining to the "linear/integer algorithm" branch, and to exemplary look-up tables (Table 1B, Table 2B and Table 3B) shown in FIG. 6B. It should be noted that Tables 1B, 2B and 3B identify the same parameters, such as "data file name", "problem type", etc., as Tables 1A, 2B, and 3B, which have been already discussed above in detail and thus will not discussed further; however, values provided for these parameters in Tables 1B, 2B and 3B are pertinent to solving "calorie diet problems" requiring the use of "linear" optimization algorithm.

In this example, assume that the current optimization problem involves identifying food items and amounts that a user can consume at minimum food costs to obtain 2250 calories per day. Here, one objective of the problem is to obtain 2250 calories at minimum food cost. As discussed above, the system is pre-programmed and thus recognizes that the current problem is a "calorie diet" problem requiring the use of the "linear" optimization algorithm (Step S30 in FIG. 3) and that all "calorie diet" problems have the same constraint matrix. It is further assumed that the system has been programmed to recognize that the equation named "EQ10" identifies all equations used to pre-solve this type of calorie diet problem. Based on the above information, an advanced basis having the same constraint matrix as the current problem is searched (Step S35 in FIG. 4). This can be accomplished as follows. Table 1B is searched for a data file identifying the problem type "calorie diet" and the optimization algorithm "linear" and thus, the data file named "diet 1" is identified. Given that all "calorie diet" problems have the same constraint matrix, it is understood that any advanced basis included in the data file named "diet 1" has the same constraint matrix as the current problem and thus, the identification of the data file named "diet 1" indicates that at least one advanced basis with the same constraint matrix as the current problem is found (Step S36 in FIG. 4). At this time, Steps S35 and S36 are completed and the process proceeds to Step S37 which tests the solutions stored in the data file named "diet 1" for feasibility. This step (S37) can be accomplished as follows. Table 3A is searched for rows with the data file named "diet 1" and the RHS value which is less than or equal to the desired calorie value of 2250 given the equation name "EQ10." Rows R1 and R4 satisfy this criteria and from their solutions IDs (S2000 and S2200), it is determined that the solutions identified by the solution IDs "S2000" and "S2200" are feasible solutions. At this point, the process of Step S37 is concluded and the process moves on to Step S39 which selects one advanced basis with the lowest objective value from the advanced bases associated with the identified feasible solution IDs (S2000 and S2200). Step S39 can be accomplished as follows. Table 2B is searched for row identifying the data file named "diet 1" and the solution ID "S2000" or "S2200" (identified in Step S37). Thus, rows R1 and R2 are selected and their objective values (here, representing some value associated with costs) are examined. The objective value "11" identified in row R2 is lower than the objective value "12" identified in row R1 and thus, row R2 is finally selected since it has the lowest objective value and the problem involves "minimizing" the cost. The address "3020" identified in row R2 of Table 2B is then used to retrieve the associated advanced basis as the best advanced basis for the current problem. At this time, the process of Step S39 is completed and the process continues to S18 as discussed above.

The present invention is applicable wherever optimization solutions are quickly sought. For example, the present invention may be incorporated into an environment wherein a user seeks portfolio optimization solutions through a communication network such as the Internet, which is the subject matter of the copending application, U.S. patent application Ser. No. 09/460,608, entitled "Internet-Based System For Calculating Optimal Equity Portfolios," or into an environment wherein a user is automatically informed of the rebalancing needs and optimization solutions via customer-defined communication methods, such as a PDA (personal digital assistance) method, a cell phone method, etc, which is the subject matter of the copending application entitled "System and Method of Automatically Rebalancing Portfolios by Single Response." Furthermore, some of the computer codes used to implement the steps of the present method may be programmed as user-defined functions (UDFs), which is the subject matter of the copending application, U.S. application Ser. No. 09/516,514, entitled "Technique For Data Mining Of Large Scale Relational Databases Using SQL." For example, computer code for determining the feasibility of a solution and the Euclidian distance may be implemented as user-defined functions. This allows easy parallel execution of searches by multiple processors.

The present invention is advantageous because it reduces computation time needed to solve an optimization problem. By pre-computing optimal solutions to a plurality of anticipated optimization problems, many of the iterative calculation steps can be eliminated and the response time to the problem can be improved significantly. If the current problem is identical or almost identical (this allowing some degree of flexibility) to one of the stored anticipated problems, then no iterative calculations are needed to find the optimal solutions because the pre-solved solutions to the anticipated problem can be directly output as the optimal solutions to the current problem. If the current problem is similar (but not identical or almost identical) to one or more of the stored anticipated problems, then fewer iterative calculations may be needed to find optimal solutions since the stored advanced basis can be utilized as the starting data for iterations. Thus, in general, optimal solutions to an optimization problem can be produced much faster and more efficiently. This technique is particularly useful in user-interactive applications requiring a fast response time, such as Internet-based applications.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A computer-implemented method for solving a current financial portfolio optimization problem inputted by a user of a computer system comprising the steps of:

storing, on a computer, a plurality of data groups each associated with one of a plurality of anticipated financial portfolio optimization problems, each of the data groups including solutions to a corresponding anticipated financial portfolio optimization problem, each of the data groups further including input values and intermediate calculation values associated with the corresponding anticipated financial portfolio optimization problem, wherein said storing occurs before said current financial portfolio optimization problem is input;

compiling, using said computer, said solutions to produce a set of results from said solving anticipated financial portfolio optimization problems;

preparing and storing, on said computer, a plurality of look-up tables for identifying each of said results, the plurality of look-up tables containing equation names, RHS (Right Hand Side) values, and objective values pertaining to the plurality of anticipated financial portfolio optimization problems;

solving, using said computer, the current financial portfolio optimization problem using the stored results from said solved anticipated financial portfolio optimization problems, the solving step including the steps of:

selecting, using user-defined functions, at least one of the stored results using the look-up tables; and determining whether or not the selected result contains solutions to the current financial portfolio optimization problem;

wherein, if the determining step determines that the selected result contains solutions to the current financial portfolio optimization problem, then the optimal solutions included in the selected result are output as optimal solutions to the current financial portfolio optimization problem; and wherein, if the determining step determines that the selected result does not contain solutions to the current financial portfolio optimization problem, then the selected result is modified using a search method, and the current financial portfolio optimization problem is iteratively solved using the modified data group to obtain solutions to the current problem.

2. A system for solving a current financial portfolio optimization problem inputted by a user of a computer system comprising:

a storage unit, in a computer, storing a plurality of data groups each associated with one of a plurality of anticipated financial portfolio optimization problems, each of the data groups including solutions to a corresponding anticipated financial portfolio optimization problem, each of the data groups further including input values and intermediate calculation values associated with the corresponding anticipated financial portfolio optimization problem, wherein said storing occurs before said current financial portfolio optimization problem is input;

and an optimization unit in said computer, said optimization comprising:

means for compiling a set of results from said solving anticipated financial portfolio optimization problems;

means for preparing and storing a plurality of look-up tables for identifying each of said results, the plurality of look-up tables containing equation names, RHS (Right Hand Side) values, and objective values pertaining to the plurality of anticipated financial portfolio optimization problems; means for solving the current financial portfolio optimization problem using the stored results from said solved anticipated financial portfolio optimization problems, the solving means including:

means for selecting, using user-defined functions, at least one of the results using the look-up tables; and means for determining whether or not the selected result contains solutions to the current financial portfolio optimization problem;

wherein, if the determining means determines that the selected result contains solutions to the current financial portfolio optimization problem, then the solutions included in the selected result are output as solutions to the current financial portfolio optimization problem; and wherein, if the determining means determines that the selected result does not contain solutions to the current financial portfolio optimization problem, then the selected result is modified using a search method, and the current financial portfolio optimization problem is iteratively solved using the modified data group to obtain solutions to the current problem.

* * * * *